3,425,909
METHOD OF CONVERTING STARCH
Edwin L. Speakman, Clinton, Iowa, assignor to Standard Brands Incorporated, New York, N.Y., a corporation of Delaware
No Drawing. Filed Mar. 9, 1966, Ser. No. 532,845
U.S. Cl. 195—31        5 Claims
Int. Cl. C12d 13/04

This invention relates to the conversion of starch with starch liquefying or thinning enzymes.

It is known that starches can be thinned in a water slurry by treatment with starch liquefying enzymes, for instance alpha-amylase. However, this process entails several disadvantages. The starch does not hydrolyze very rapidly, a large viscosity change occurs when the enzyme is inactivated by heat at the end of the starch thinning process, the viscosity of the paste increases considerably when it is cooled, retrogradation takes place on storage of the paste causing objectionable thickening, an objectionable sludge forms and there is not enough buffer capacity to cope with variations in the pH which occur from time to time.

An object of this invention is an improved method of converting starch with enzymes. A more specific object of the invention is to accomplish such conversion in a slurry containing dodecyl trimethyl ammonium chloride.

I have discovered that the thining or liquefaction of starch with enzymes can be improved if it is carried out in a slurry containing a small amount of dodecyl trimethyl ammonium chloride. This process offers advantages over enzyme conversion of starch in a slurry which does not contain the aforementioned quaternary amine in that the conversion proceeds more rapidly, the final viscosity of the paste is lower, the conversion can be carried out at a lower temperature and the paste obtained does not thicken as much on storage.

The quaternary amine may be added to the starch slurry in which the starch conversion reaction is to be performed or it may be included in the starch before this slurry is prepared. It may be blended with dry starch or it may be introduced at an appropriate point in the starch manufacturing process, for instance in the starch slurry obtained as a product of such process.

The quaternary amine preparations employed in my experiments were obtained from Armour and Company and are designated by the trade name "Arquad." The active ingredients of Arquad #12, used in Examples 1-3, are comprised of 90% dodecyl trimethyl ammonium chloride, about 9% tetradecyl trimethyl ammonium chloride and about 1% octadecenyl trimethyl ammonium chloride.

In order more clearly to disclose the nature of the present invention, specific examples will hereinafter be described. It should be understood, however, that this is done solely by way of example and is intended neither to delineate the scope of the invention nor limit the ambit of the appended claims. In the examples and throughout this specification percentages are intended to refer to percent by weight, unless otherwise specified.

EXAMPLE 1

A slurry for determination of enzyme convertibility of starch in the presence of dodecyl trimethyl ammonium chloride was prepared by suspending 75 grams dry basis unmodified cornstarch in about 400 ml. distilled water, adding 15 grams of a 50% solution of Arquad 12 in isopropanol, equivalent to 10% by weight dry basis based on the starch, adding 0.01% of a commercial alpha-amylase enzyme preparation (Vanzyme 31) based on the weight of the starch, adjusting the weight of the suspension to slightly less than 500 grams, adjusting the pH from its value of 5.2 up to 6.5 with dilute sodium hydroxide solution and maintaining at 6.5 for 30 minutes, finally adjusting the suspension weight to 500 grams with distilled water, and heating the suspension in the Brabender amylo-visco-graph according to the following time-temperature cycle.

(1) Warm the suspension to 50° C., then heat to 78° C. at a rate of 1.5 degrees centigrade per minute.
(2) Hold at 78° C. for 15 minutes.
(3) Heat from 78° C. to 95° C. at 1.5° C. per minute.
(4) Hold at 95° C. for 20 minutes.
(5) Cool from 95° C. to 50° at 1.5° C. per minute.
(6) Hold at 50° C. for 20 minutes.

Another starch paste serving as a control was made in the same way using starch from the same lot but without adding any quaternary amine. Comparison of the two curves showed that dodecyl trimethyl ammonium chloride imparted a definite and marked change in the convertibility pattern in that the enzyme was able to start its attack on the starch sooner, resulting in a decreased peak viscosity, and generally decreased viscosity throughout the conversion cycle. Also the paste containing the quaternary amine had a desirable lower viscosity and decreased tendency to thicken on cooling and aging.

EXAMPLE 2

A series of corn starch suspensions, containing Arquad 12 were prepared as described in Example 1 and they were heated in the Brabender visco-amylo-graph as described therein. The concentration of the quaternary amine in these suspensions was 0.00, 0.05, 0.15, 0.30, 0.63, 1.25, 2.5, 5.0 and 10.0% by weight dry basis based on the starch. Included also was a suspension containing 0.63% by weight of isopropanol based on the starch but none of the amine. The Brabender converting curves resulting from varying the quaternary amine concentration showed that with 0 to 0.30% amine the minimum viscosity and the viscosity at the end of cooling and aging progressively decreased. At 0.63% amine, the minimum viscosity portion increased slightly over that obtained with 0.30%, while the viscosity on cooling and aging was much lower. Further increases in the amine concentration did not sensibly alter the minimum viscosity, but the viscosity of the aged paste progressively increased, and gelatinization started at progressively earlier times. From the standpoint of obtaining both minimum viscosity at the end of the high temperature hold period and least thickening on aging, a quaternary amine concentration of about 0.63% based on the starch appears to be optimum. Since the data obtained from converting in the presence of isopropanol were essentially the same as those from converting with no additives, it was concluded that the effects observed were due entirely to the presence of dodecyl trimethyl ammonium chloride.

EXAMPLE 3

The starch used for this experiment was a commercial cornstarch which had good convertibility. When the batch of starch slurry was ready for finishing, a sample was obtained and 5 liters placed in each of three containers. This slurry had a pH of 6.4 and contained 28.5% dry basis starch. Additions of Arquad 12 in isopropanol were made to the slurries to provide dodecyl trimethyl ammonium chloride concentrations of 0, 0.3 and 0.6% based on the weights of the starch. The pH of the third slurry was slightly reduced by the addition, and was restored by the addition of sodium hydroxide solution. The slurries were then filtered, and the cakes puddled and dried at 180° F. in a laboratory model Proctor & Schwartz drier having forced air circulation. Evaluation of this series of sample via Brabender conversions in the manner described in Example 1 showed definite improvements in convertibility and reduced tendency to thicken on holding. The conclusion was drawn that addition of the amine to slurries prior to finishing was feasible, and that heat during drying of the product was not detrimental. In fact, the results obtained were regarded as very good, especially in view of the loss of agent which had to occur during finishing.

EXAMPLE 4

Other Arquads were evaluated for their effect on convertibility of starch, using 2.5% Arquad solids based on the starch. The materials evaluated were Arquad 18, 2C, S, C, T and 2HT which have the composition indicated below.

| Alkyl group | Carbon chain length | Percent | | | | | |
|---|---|---|---|---|---|---|---|
| | | 18 | 2C | S | C | T | 2HT |
| Octyl | 8 | | 8 | | 8 | | |
| Decyl | 10 | | 9 | | 9 | | |
| Dodecyl | 12 | | 47 | | 47 | | |
| Tetradecyl | 14 | | 18 | | 18 | | |
| Hexadecyl | 16 | 6 | 8 | 10 | 8 | 30 | 30 |
| Octadecyl | 18 | 93 | 10 | 10 | 5 | 25 | 70 |
| Octadecenyl | 18 | 1 | | 35 | 5 | 45 | |
| Octadecadienyl | 18 | | | 45 | | | |

None of these materials showed the behavior demonstrated by Arquad 12. Arquad C and 2C, containing about half as much dodecyl groups as Arquad 12 plus other long chain groups, imparted fair convertibility but poor stability, while those Arquads containing no dodecyl groups gave poor to very poor results. This was interpreted as indicating that the dodecyl group was the most active in causing starch to swell, and that some groups appeared to be detrimental to conversion.

The terms and expressions which have been employed are used as terms of description and not of limitation, and it is not intended, in the use of such terms and expressions, to exclude any equivalents of the features shown and described or portions thereof, since it is recognized that various modifications are possible within the scope of the invention claimed.

What is claimed is:
1. The method of preparing an enzyme-converted starch which comprises providing a slurry of water, starch, alpha-amylase and a small amount of dodecyl trimethyl ammonium chloride effective to increase the rate of conversion of the starch and maintaining the slurry at a temperature at which the enzyme converts the starch until the starch has been thinned to the desired extent.
2. The method as claimed in claim 1 wherein the starch is cornstarch.
3. The method as defined in claim 1 wherein the amount of dodecyl trimethyl ammonium chloride is within the range from 0.01 to 5.0% based on the dry weight of the starch.
4. A method as defined in claim 3 wherein the amount of dodecyl trimethyl ammonium chloride is about 0.63% based on the dry weight of the starch.
5. A method as defined in claim 4, wherein the starch is cornstarch.

References Cited

UNITED STATES PATENTS 3,378,462  4/1968  Denault _____ 195—31

ALVIN E. TANENHOLTZ, *Primary Examiner.*